(12) United States Patent
Dowd et al.

(10) Patent No.: US 11,994,177 B2
(45) Date of Patent: May 28, 2024

(54) UNIVERSAL JOINT CONNECTION FOR THE MANUAL POSITIONING OF AN ANGULARLY OFFSET VALVE SHAFT DRIVE

(71) Applicant: Hamilton Sundstrand Corporation, Charlotte, NC (US)

(72) Inventors: Peter J. Dowd, Granby, CT (US); John M. Dehais, Windsor, CT (US); David J. Zawilinski, West Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 161 days.

(21) Appl. No.: 17/390,847

(22) Filed: Jul. 30, 2021

(65) Prior Publication Data

US 2023/0035816 A1 Feb. 2, 2023

(51) Int. Cl.
*F16D 3/16* (2006.01)
*B64D 13/06* (2006.01)
*F02C 6/08* (2006.01)
*F16D 3/32* (2006.01)
*F16K 31/46* (2006.01)

(52) U.S. Cl.
CPC ................. *F16D 3/16* (2013.01); *F16D 3/32* (2013.01); *F16K 31/465* (2013.01); *B64D 2013/0618* (2013.01); *F02C 6/08* (2013.01)

(58) Field of Classification Search
CPC ...................................... F16D 3/16; F16D 3/32
See application file for complete search history.

(56) References Cited

U.S. PATENT DOCUMENTS 1,304,103 A * 5/1919 Runyan ..................... F16D 3/32
464/178
1,979,768 A * 11/1934 Pearce ....................... F16D 3/32
464/118

(Continued)

FOREIGN PATENT DOCUMENTS

CN 204437437 U 7/2015
CN 109667976 A 4/2019

(Continued)

OTHER PUBLICATIONS

Extended European Search Report dated Dec. 13, 2022, received for corresponding European Application No. 22187215.3, pp. 6.

*Primary Examiner* — Angelisa L. Hicks
(74) *Attorney, Agent, or Firm* — Kinney & Lange, P.A.

(57) ABSTRACT

A manual positioning assembly for connection to a shaft of a valve configured to manually manipulate a disc of the valve between an open and closed position. The manual valve positioning assembly includes a housing having a first and a second end. The first end includes a flange configured for fastening the housing to the valve. The second end includes a conical feature. An alignment bushing within the second end of the housing and a double universal joint. The double universal joint includes a first end and a second end. The first end of the double universal joint is configured to be mechanically fastened to the shaft of the valve. The second end is positioned within the alignment bushing and includes a socket configured to receive a tool that manually turns the double universal joint, the shaft, and the disc to position the disc in the open or closed position.

20 Claims, 5 Drawing Sheets

(56) References Cited

U.S. PATENT DOCUMENTS

| | | | | |
|---|---|---|---|---|
| 4,605,332 A | * | 8/1986 | Mayhew | F16D 3/848 |
| | | | | 403/50 |
| 4,610,559 A | * | 9/1986 | Mayhew | E04G 5/00 |
| | | | | 403/58 |
| 4,697,615 A | | 10/1987 | Tsuchimoto et al. | |
| 5,197,816 A | * | 3/1993 | McDonald | F16D 3/32 |
| | | | | 403/57 |
| 6,959,914 B1 | | 11/2005 | Corral | |
| 7,014,429 B2 | | 3/2006 | Gray, Jr. et al. | |
| 9,267,611 B2 | | 2/2016 | Sisk | |
| 10,456,206 B2 | * | 10/2019 | Hares | A61B 34/30 |
| 2014/0370995 A1 | * | 12/2014 | Collins | F16D 3/845 |
| | | | | 464/138 |
| 2018/0010694 A1 | | 1/2018 | Kelly et al. | |

FOREIGN PATENT DOCUMENTS

| | | | | |
|---|---|---|---|---|
| CN | 211649084 U | * | 10/2020 | |
| CN | 212536463 U | * | 2/2021 | |
| WO | WO-2005056150 A2 | * | 6/2005 | B01D 1/22 |

\* cited by examiner

UNIVERSAL JOINT CONNECTION FOR THE MANUAL POSITIONING OF AN ANGULARLY OFFSET VALVE SHAFT DRIVE

BACKGROUND

The present disclosure is directed generally to butterfly valves, and more specifically, to the manual actuation of butterfly valves.

Aircraft include systems that require valves to control the flow of fluid, e.g., a gas or a liquid, therethrough. Butterfly valves are one type of valve used to control the flow of fluid through aircraft systems. Butterfly valves must be able to operate in harsh conditions. For example, butterfly valves must be able to withstand high temperature and high vibrational environments. As a result of the conditions, butterfly valves can fail and require manual manipulation.

SUMMARY

In one example, a valve assembly includes a cylindrical valve housing and a shaft extending through the cylindrical valve housing. The shaft includes a first end and a second end. The first end is mechanically coupled to an actuation mechanism. A disc is attached to the shaft. The shaft and the disc rotate within the cylindrical valve housing to position the disc in an open position or a closed position. The valve assembly also includes a manual positioning assembly attached to the cylindrical valve housing opposite of the actuation mechanism. The manual positioning assembly includes a housing removably coupled to the cylindrical valve housing and a double universal joint. The double universal joint includes a first end and a second end. The first end of the double universal joint is mechanically coupled to the second end of the shaft. The second end of the double universal joint includes a socket that is configured to receive a tool to manually turn the double universal joint, the shaft, and the disc to manually orient the disc in the open position or the closed position.

In another example, a manual positioning assembly for connection to a shaft of a valve and is configured to manually manipulate a disc of the valve between an open and a closed position. The manual valve positioning assembly includes a housing having a first end and a second end. The first end includes a flange configured for fastening the housing to the valve. The second end includes a conical feature. The manual positioning assembly also includes an alignment bushing within the second end of the housing and a double universal joint. The double universal joint includes a first end and a second end. The first end of the double universal joint is configured to be mechanically fastened to the shaft of the valve. The second end of the double universal joint is positioned within the alignment bushing and includes a socket that is configured to receive a tool that manually turns the double universal joint, the shaft, and the disc to position the disc in the open or the closed position.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a valve that includes a manual positioning assembly. The valve includes a valve housing, a shaft, a disc, and an actuation mechanism. The manual positioning assembly is attached to the valve housing opposite the actuation mechanism. The manual positioning assembly includes a housing, a double universal joint, and an alignment bushing. The housing includes a flange on a first end and a conical feature on a second end. The flange of the housing is used to attach the manual positioning assembly to the valve housing. In addition, the housing includes a bend between the first end and the second end. Thus, the first end of the housing and the second end of the housing are angularly misaligned.

The double universal joint includes a first shaft, a center yoke, and a second shaft. The first shaft of the double universal joint extends from a first end of the double universal joint towards the center yoke. The first shaft of the double universal joint includes a first hinge that attaches the first shaft to the center yoke. A first end of the first shaft of the double universal joint is hollow to receive the shaft of the valve. In one example, a pin is used to secure the shaft of the valve and the first shaft of the double universal joint. The second shaft of the double universal joint extends from the second end of the double universal joint toward the center yoke. The second shaft includes a second hinge that attaches the second shaft of the double universal joint to the center yoke opposite of the first shaft of the double universal joint. At the second end of the double universal joint, the second shaft includes a socket that is sized and shaped to receive a maintenance tool.

When the valve becomes stuck or the actuation mechanism is unable to manipulate the valve into the open or closed positions, the manual positioning assembly actuates the valve by inserting a maintenance tool into the socket of the second end of the double universal joint and applying a torque to the socket of the second end of the double universal joint. The second shaft transmits the torque from the socket to the center yoke. The center yoke transmits the torque from the second shaft of the double universal joint to the first shaft of the double universal joint. The pin that secures the shaft of the valve and the first shaft of the double universal joint transmits the torque from the first shaft of the double universal joint to the shaft of the valve. In response to the torque on the shaft of the valve, the shaft of the valve and the disc rotate within the valve housing to manually open or close the valve. The valve with the manual positioning assembly will be discussed below with reference to the figures.

Figure 1:
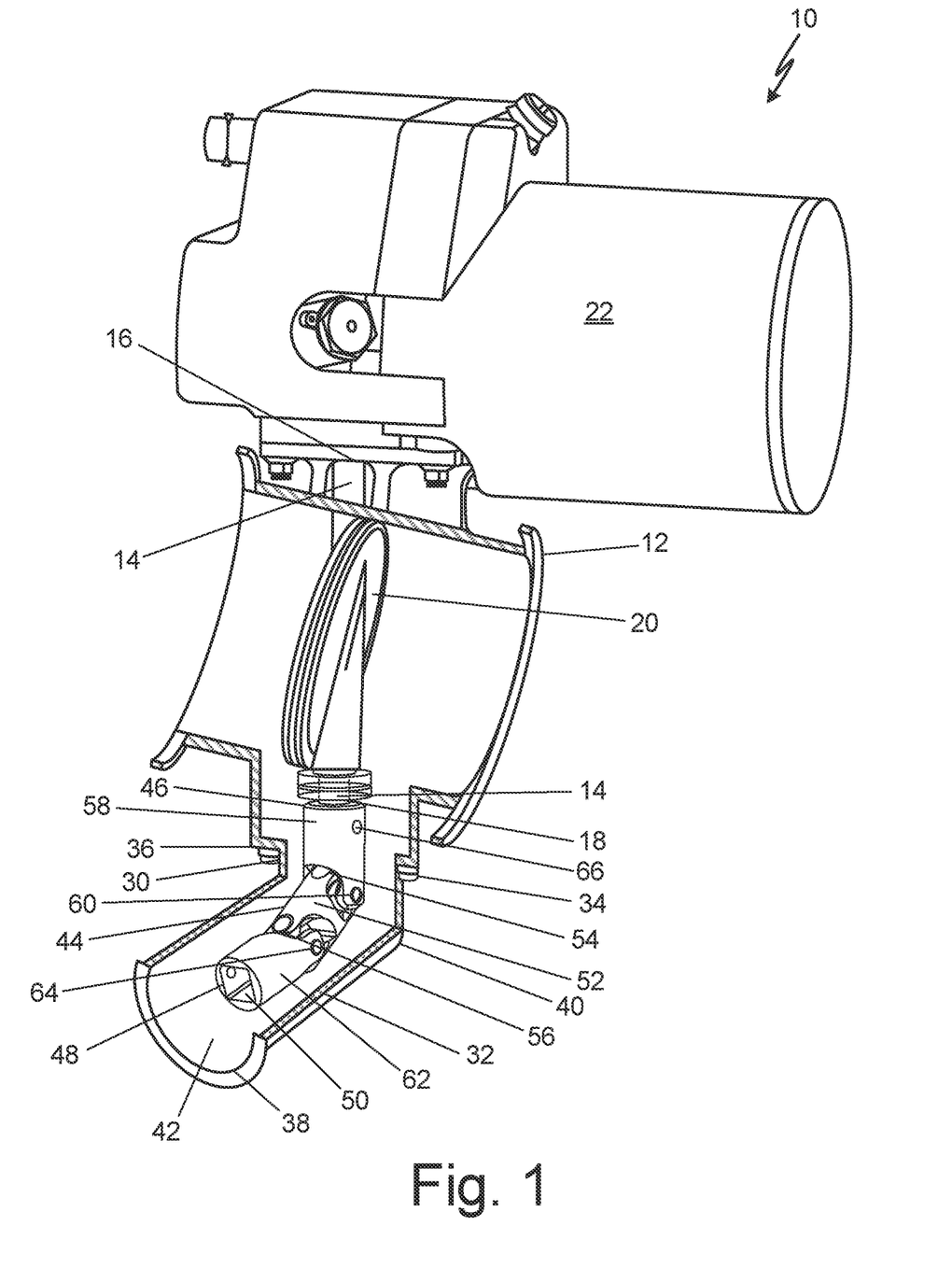
FIG. 1 is a partial cross-sectional view of a valve with a manual positioning assembly.

FIG. 1 is a partial cross-sectional view of valve 10 with manual positioning assembly 30. Valve 10 includes valve housing 12, shaft 14, disc 20, and actuation mechanism 22. Manual positioning assembly 30 includes housing 32, double universal joint 44, pin 66 (shown in FIG. 2), and alignment bushing or bushing 70 (shown in FIG. 2). Housing 32 includes first end 34, second end 38, and bend 40. First end 34 includes flange 36. Second end 38 includes conical surface or conical feature 42. Double universal joint 44 includes first end 46, second end 48, center yoke 52, first shaft 58, and second shaft 62. Second shaft 62 includes socket 50 at second end 48 of double universal joint 44. Center yoke 52 includes first end 54 and second end 56. First shaft 58 includes first hinge 60. Second shaft 62 includes second hinge 64. Bushing 70 includes internal surface 72 (shown in FIG. 2).

In the non-limiting example of FIG. 1, valve housing 12 is cylindrical. In another non-limiting example, valve housing 12 can be cubic, spherical, or any other shape containing a valve to control flow through a system. Valve shaft 14 extends from first end 16 to second end 18. Valve shaft 14 extends through valve housing 12. First end 16 and second end 18 of shaft 14 extend outside valve housing 12. Disc 20 is attached to shaft 14, such that shaft 14 and disc 20 rotate within valve housing 12 to position disc 20 in an open position or a closed position. In one non-limiting example, disc 20 can be removably coupled, e.g., bolted or fastened in any other manner, to shaft 14. In another non-limiting example, disc 20 can be permanently attached, e.g., welded, to shaft 14. In another non-limiting example, disc 20 and shaft 14 can be one unitary piece that extends through valve housing 12, with disc 20 contained within valve housing 12.

Actuation mechanism 22 is mounted on valve housing 12 and is attached to first end 16 of shaft 14. In one non-limiting example, actuating mechanism 22 can be a servo-valve-controlled actuator. In another non-limiting example, actuating mechanism 22 can be any other device that can translate one form of energy into a rotational force. Actuating mechanism 22 rotates first end 16 of shaft 14 to orient shaft 14 and disc 20 in the open or closed positions in standard operating conditions. If actuating mechanism 22 fails, or if valve 10 fails in a manner that prevents the rotation of shaft 14 and disc 20, manual positioning assembly 30 is used to manipulate shaft 14 and disc 20.

Manual positioning assembly 30 is attached to valve housing 12 opposite of actuation mechanism 22. Housing 32 is connected to valve housing 12 and double universal joint 44 is inside housing 32. Housing 32 extends from first end 34 to second end 38. Bend 40 is between first end 34 and second end 38, such that first end 34 and second end 38 are angularly misaligned. Flange 36 at the first end 34 of housing 32 is mechanically fastened to valve housing 12. Conical feature 42 of housing 32 tapers radially inward between second end 38 and bend 40. Conical feature 42 is configured to direct a tool, e.g., wrench, bit, pneumatic or battery-powered drill, or ratchet, toward socket 50 in second shaft 62 on the second end 48 of double universal joint 44. Manual positioning assembly 30 will be discussed below with reference to FIG. 2.

Figure 2:
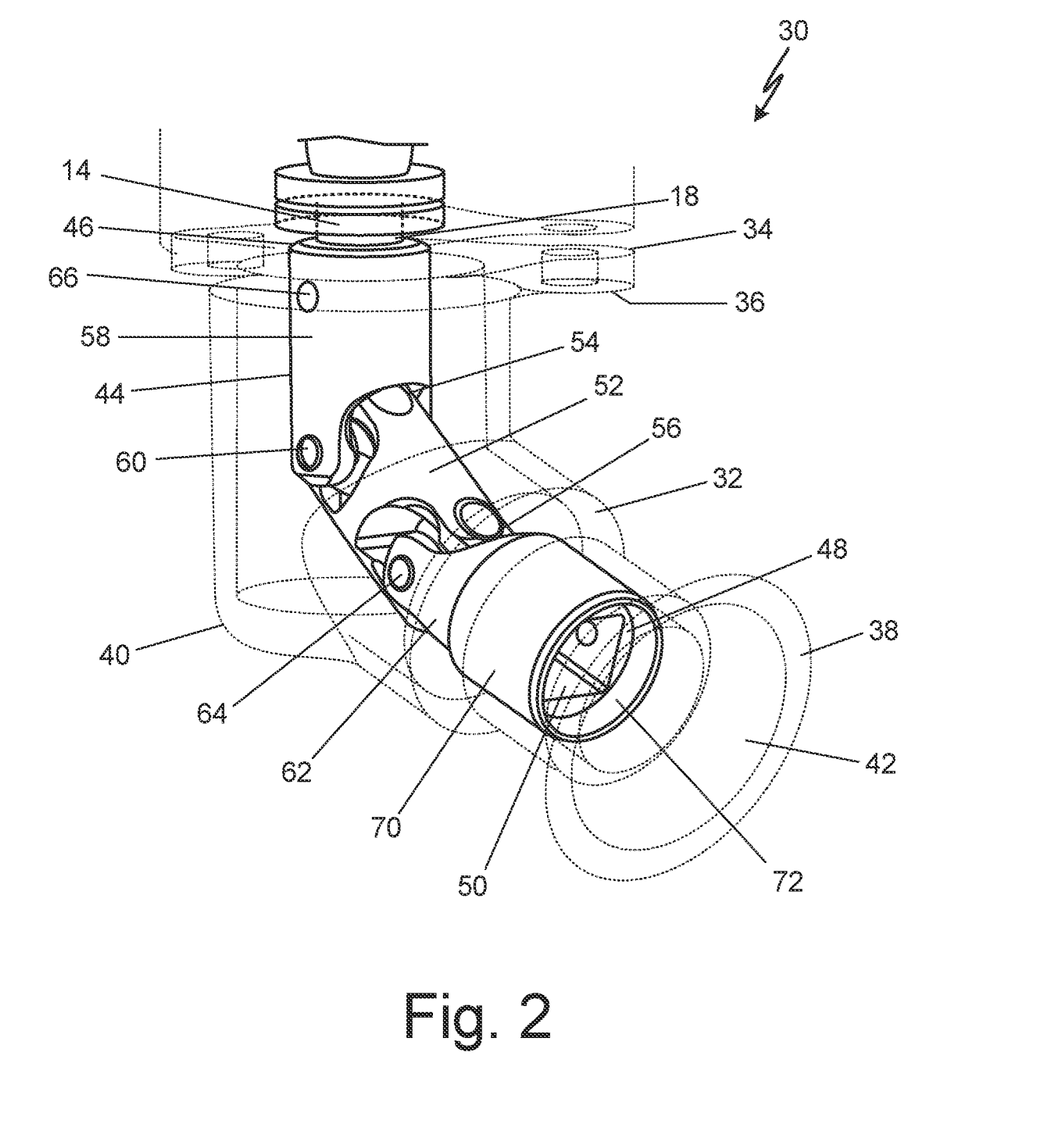
FIG. 2 is a perspective of the manual positioning assembly with a housing shown in phantom view.

FIG. 2 is a perspective view of manual positioning assembly 30 with housing 32 in phantom view. First shaft 58 of double universal joint 44 extends from first end 46 of double universal joint 44 toward center yoke 52. First hinge 60 attaches first shaft 58 to center yoke 52 such that first shaft 58 can rotate in unison with center yoke 52 while out of alignment with center yoke 52. Second shaft 62 of double universal joint 44 extends from second end 48 of double universal joint 44 toward center yoke 52. Second hinge 64 attaches second shaft 62 to center yoke 52 such that second shaft 62 can rotate in unison with center yoke 52 while out of alignment with center yoke 52.

First shaft 58 is hollow at first end 46 of double universal joint 44 to receive second end 18 of shaft 14. As shown in FIG. 2, first shaft 58 of double universal joint 44 and shaft 14 are concentrically aligned. The concentric alignment between shaft 14 and first shaft 58 of double universal joint 44 helps transfer torque from first shaft 58 of double universal joint 44 to shaft 14 without adding additional bending or torsional stresses to shaft 14.

In the non-limiting example shown in FIG. 2, pin 66 couples first shaft 58 of double universal joint 44 and second end 18 of shaft 14. Pin 66 prevents second end 18 of shaft 14 from having axial play within first shaft 58. Additionally, pin 66 transmits torque from first shaft 58 to second end 18 of shaft 14. Pin 66 is sized to withstand a maximum torque applied by tool to socket 50 at second end 48 of double universal joint 44. In another non-limiting example, first shaft 58 of double universal joint 44 and second end 18 of shaft 14 can be coupled with any other means of transferring torque while maintaining axial positioning. For example, first shaft 58 of double universal joint 44 and second end 18 of shaft 14 can be coupled with an internal lug system or any other type of shaft coupler that can transmit torque in harsh environments, e.g., high temperature and high vibrational conditions.

Bushing 70 is contained within second end 38 of housing 32 and circumferentially surrounds second shaft 62 at second end 48 of double universal joint 44. Bushing 70 ensures that second shaft 62 of double universal joint 44 is aligned correctly within housing 32 by eliminating slop or play between second shaft 62 of double universal joint 44 and housing 32. Internal surface 72 of bushing 70 can include a coating that provides low surface energy, e.g., less than 36 dynes/cm. In one non-limiting example, internal surface 72 can be coated in Teflon™. In another non-limiting example, internal surface 72 can be coated with any other coating that results in surface energy of less than 36 dynes/cm. The coating on internal surface 72 of bushing 70 decreases the friction between internal surface 72 of bushing 70 and second shaft 62 of double universal joint 44. The decreased friction between internal surface 72 of bushing 70 and second shaft 62 of double universal joint 44 decreases the resistance to rotation of shaft 14 and disc 20 within valve housing 12. The decreased resistance to rotation of shaft 14 and disc 20 within valve housing 12 decreases the load on all components of valve 10, which increases the anticipated life of valve 10.

Housing 32 can be adjusted in size to accommodate various scenarios. Bend 40 can be altered to change the positioning of second end 38 of housing 32 relative to first end 34 of housing 32. For example, if valve 10 is installed in a location that has limited space, bend 40 can be altered to change an angle of approach that maintenance personal can engage with socket 50 in second shaft 62 on second end 48 of double universal joint 44. Additionally, the length of housing 32 can be altered to improve access to socket 50 of double universal joint 44. For example, the distance between first end 34 of housing 32 and bend 40 can be increased to increase the clearance below valve 10. In another non-limiting example, if valve 10 requires more axial clearance from a centerline of shaft 14, the distance between second end 38 and bend 40 of housing 32 can be increased. Conversely, if valve 10 requires less clearance axially from the centerline of shaft 14, the distance between second end 38 and bend 40 of housing 32 can be decreased.

The dimensions of double universal joint 44 can be altered to accommodate changes in size to housing 32. For example, center yoke 52 can be altered to accommodate changes to bend 40. If bend 40 is altered to decrease the angle between the center point of first end 34 of housing 32 and the center point of second end 38 of housing 32, the length of center yoke 52 can be decreased accordingly. Alternatively, if the length of bend 40 is increased, the length of center yoke 52 can be increased. In another non-limiting example, if the distance between first end 34 and bend 40 of housing 32 is increased, the length of first shaft 58 of double universal joint 44 can be increased accordingly. Conversely, if the distance between first end 34 and bend 40 of housing 32 is decreased, the length of first shaft 58 of double universal joint 44 can be decreased accordingly. If the distance between second end 38 and bend 40 is increased, the length of second shaft 62 can be increased accordingly. If the distance between second end 38 and bend 40 of housing 32 is decreased, the length of second shaft 62 can be decreased accordingly.

Figure 3A:
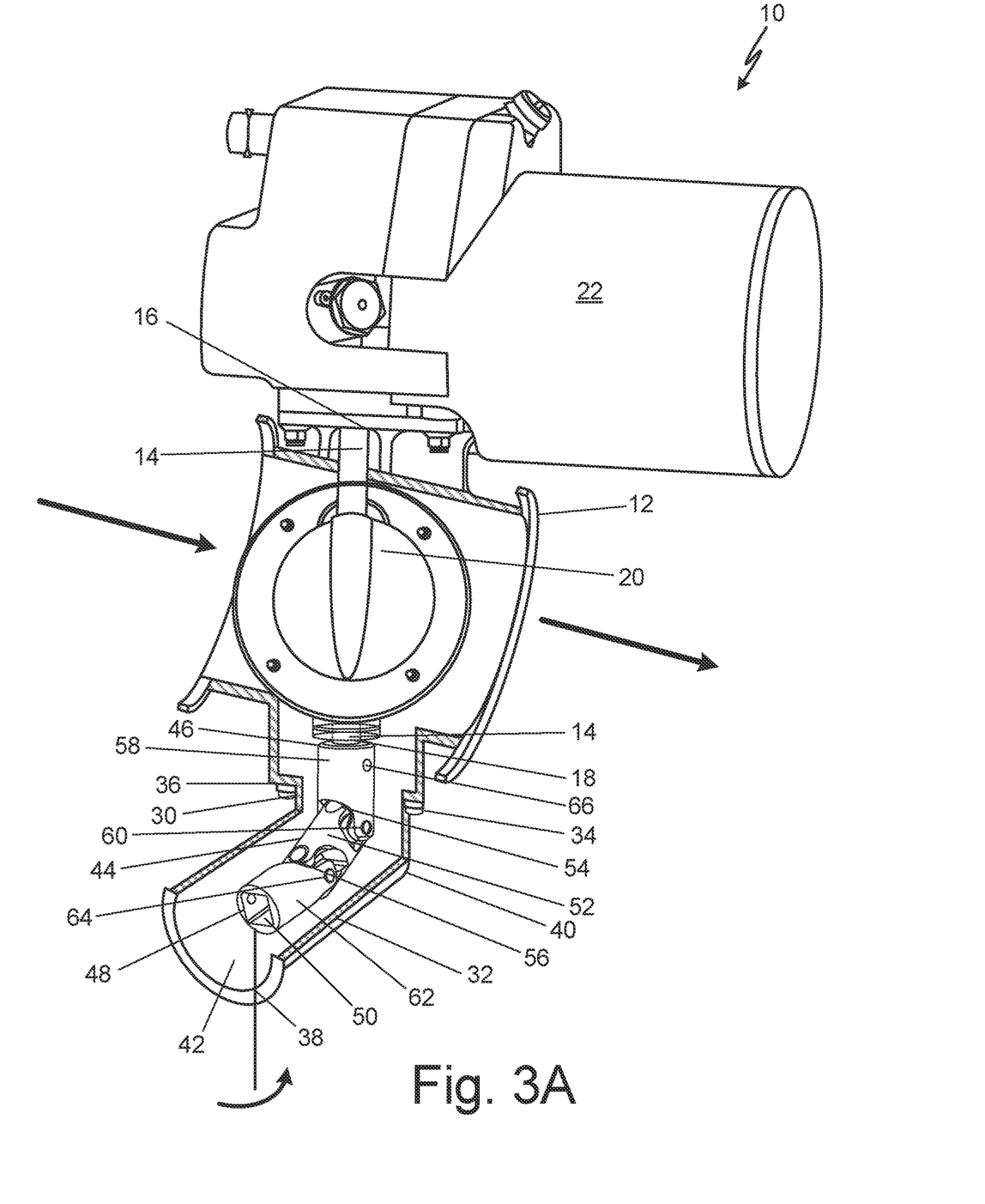
FIG. 3A is a partial cross-sectional view of a valve after manually rotating the manual positioning assembly to open the valve.
Figure 3B:
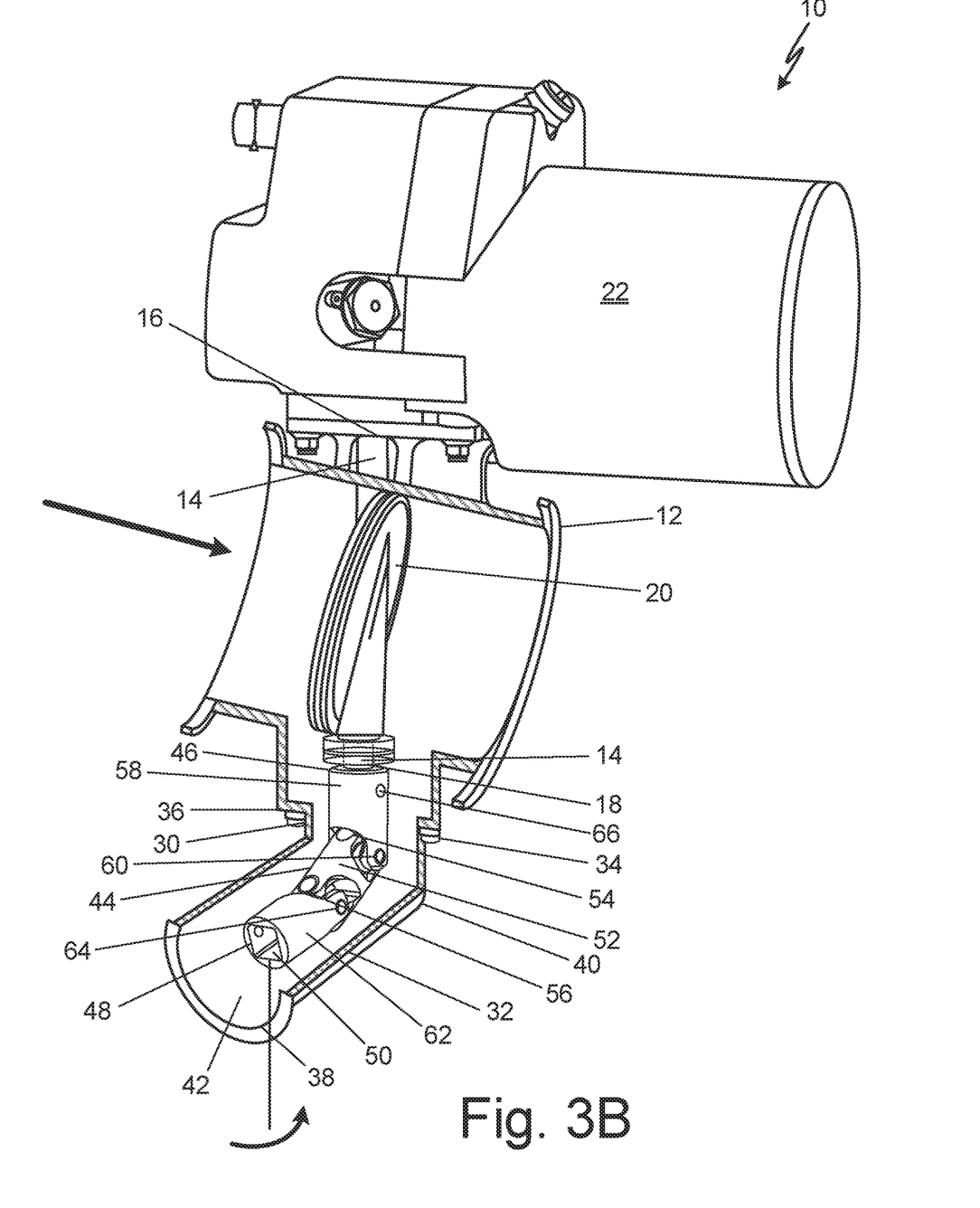
FIG. 3B is a partial cross-sectional view of a valve after manually rotating the manual positioning assembly to close the valve.

FIGS. 3A and 3B will be discussed concurrently. FIG. 3A is a partial cross-sectional view of valve 10 after manually rotating manual positioning assembly 30 to orient disc 20 in the open position. FIG. 3B is a partial cross-sectional view of valve 10 after manually rotating manual positioning assembly 30 to orient disc 20 in the closed position. As discussed above with reference to FIG. 1, conical feature 42 is configured to direct a tool, e.g., wrench, bit, pneumatic or battery-powered drill, or ratchet, toward socket 50 in second shaft 62 on the second end 48 of double universal joint 44. Socket 50 in second shaft 62 on the second end 48 of double universal joint 44 is configured to receive a tool to turn double universal joint 44, shaft 14, and disc 20 to orient disc 20 in the open position or the closed position. In the non-limiting examples shown in FIGS. 1-3B, socket 50 is a square socket configured to receive a square bit. In another non-limiting example, socket 50 can be configured to receive Phillips bits, Allen or hex bits, Torx or star bits, slot or flathead bits, or any other bit that can be used to transfer torque from a tool to a socket.

A tool (not shown) is inserted into socket 50, and torque is applied. The torque applied to socket 50 is directly transferred to center yoke 52 through second hinge 64 of second shaft 62. The torque transferred to center yoke 52 is transferred to first shaft 58 through first hinge 60. Pin 66 (shown in FIG. 2) transfers the torque of first shaft 58 to second end 18 of shaft 14. The torque transmitted to second end 18 of shaft 14 is transmitted through shaft 14 to first end 16 of shaft 14. The torque transferred to first end 16 of shaft 14 is transmitted through shaft 14 to actuation mechanism 22. Thus, if actuation mechanism 22 is bound, applying torque to socket 50 can release the bind to manipulate shaft 14, and disc 20 into an open or closed position. Similarly, because the torque applied to socket 50 is transmitted throughout the components of valve 10, applying torque to socket 50 can release a bind anywhere within valve 10. Additionally, if actuation mechanism 22 is disengaged or disconnected from valve 10, manual positioning assembly 30 can manipulate shaft 14 and disc 20 to orient disc 20 in an open or closed position.

In the non-limiting example shown in FIG. 3A, torque is applied to socket 50 to manually orient shaft 14 and disc 20 in the open position. In the non-limiting example shown in FIG. 3B, torque is applied to socket 50 to manually orient shaft 14 and disc 20 in a closed position. In another non-limiting example, torque can be applied to socket 50 to manually orient shaft 14 and disc 20 in any position between the open and closed position.

In operation valve 10 can be incorporated within a bleed-air line of a jet turbine engine of an aircraft. When a pilot is ready to start the jet turbine engine, the pilot attempts to open valve 10 by engaging actuation mechanism 22 to supply a bleed air into a turbine section of the jet turbine engine. If valve 10 fails to open, the pilot can mitigate a flight cancellation by having a maintenance person or machine manipulate valve 10 with manual positioning assembly 30. As discussed above, a tool is guided into socket 50 by conical feature 42, and a torque is applied to socket 50 in second shaft 62 on second end 56 of double universal joint 44. The torque applied to socket 50 is transferred from socket 50, through second shaft 62, second hinge 64, center yoke 52, first hinge 60, first shaft 58, pin 66 (shown in FIG. 2), and shaft 14 to manually orient shaft 14 and disc 20 in the open position. As valve 10 is opened, bleed air is supplied to the turbine section of the jet turbine engine, which enables the pilot to start the jet turbine engine.

After the jet turbine engine is started, the pilot can attempt to close valve 10 with actuation mechanism 22 to stop bleed air from flowing into the turbine section of the jet turbine engine. If the pilot cannot close valve 10, the pilot can mitigate a flight cancellation by having a maintenance person or system manipulate valve 10 with manual positioning assembly 30. As discussed above, a tool is guided into socket 50 by conical feature 42, and torque is applied to socket 50 in second shaft 62 on second end 56 of double universal joint 44. The torque applied to socket 50 is transferred from socket 50 through second shaft 62, second hinge 64, center yoke 52, first hinge 60, first shaft 58, pin 66 (shown in FIG. 2), and shaft 14 to manually orient shaft 14 and disc 20 in the closed position. As valve 10 is closed, valve 10 cuts off the supply of bleed air to the turbine section of the jet turbine engine, which helps prepare the jet turbine engine for flight.

Figure 4:
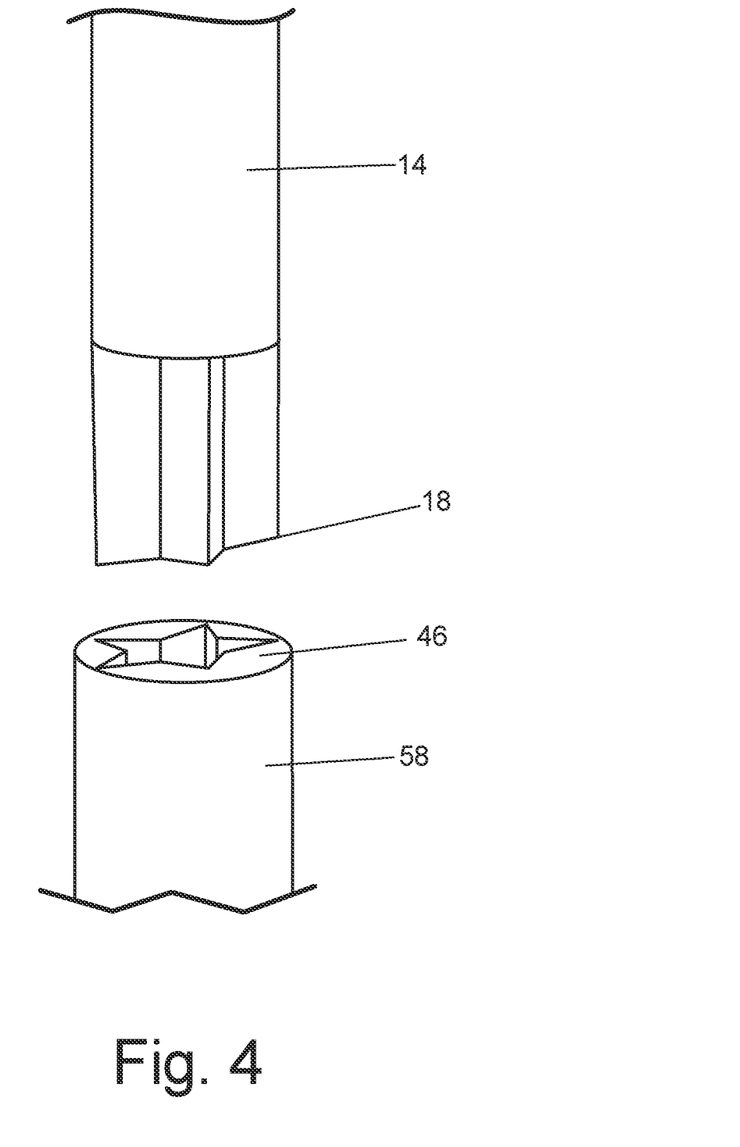
FIG. 4 is a perspective view of a valve shaft having a star-shaped plug and an end of a double universal joint having a hollowed star-shaped pattern.

FIG. 4 is a perspective view of an alternative attachment solution between shaft 14 of valve 10 and first shaft 58 of double universal joint 44. As shown in FIG. 4, first shaft 58 can include a star-patterned socket on first end 46 of double universal joint 44. Further, second end 18 of shaft 14 can include a star-shaped plug such that the star-shaped plug on second end 18 of shaft 14 fits within the star-patterned socket of first shaft 58 on first end 46 of double universal joint 44. The star-patterned socket and star-shaped plug act in concert to transmit torque from first shaft 58 of double universal joint 44 to shaft 14. In another non-limiting example, any mating shape, e.g., a twist, square, slot-post, or any other mating union that can transmit torque from one body to another, can be used to transmit the torque from first shaft 58 of double universal joint 44 to shaft 14.

Discussion of Possible Embodiments

In one example, a valve assembly includes a cylindrical valve housing and a shaft extending through the cylindrical valve housing. The shaft includes a first end and a second end. The first end is mechanically coupled to an actuation mechanism. A disc is attached to the shaft. The shaft and the disc rotate within the cylindrical valve housing to position the disc in an open position or a closed position. The valve assembly also includes a manual positioning assembly attached to the cylindrical valve housing opposite of the actuation mechanism. The manual positioning assembly includes a housing removably coupled to the cylindrical valve housing and a double universal joint. The double universal joint includes a first end and a second end. The first end of the double universal joint is mechanically coupled to the second end of the shaft. The second end of the double universal joint includes a socket that is configured to receive a tool to manually turn the double universal joint, the shaft, and the disc to manually orient the disc in the open position or the closed position.

The valve assembly of the preceding paragraph can optionally include, additionally and/or alternatively, any one or more of the following features, configurations and/or additional components:

- wherein the housing of the manual positioning assembly comprises a first end, a bend, and a second end, wherein the first end is mechanically fastened to the cylindrical housing, and wherein the bend is between the first end and the second end such that the first and second ends of the housing are angularly misaligned;
- wherein the second end of the housing comprises a conical surface that tapers radially inward between the second end of the housing and the bend configured to direct a tool toward the socket of the second end of the double universal joint;
- wherein the double universal joint comprises: a center yoke comprising a first end and a second end; a first shaft extending from the first end of the double universal joint toward the center yoke and comprises a hinge that attaches to the first end of the center yoke; and a second shaft extending from the second end of the double universal joint toward the center yoke and comprises a hinge that attaches to the second end of the center yoke, wherein the center yoke translates a torque applied to the second shaft to the first shaft;
- wherein the manual positioning assembly further comprises a bushing contained within the second end of the housing, wherein the bushing surrounds the second end of the double universal joint;
- wherein the bushing comprises an internal surface and a coating of Teflon™ on the internal surface;
- wherein the first end of the double universal joint is concentrically aligned with the second end of the shaft;
- wherein the first end of the double universal joint is hollowed out to receive the second end of the shaft;
- wherein a pin extends through the first end of the double universal joint and the second end of the shaft;
- wherein the first end of the double universal joint comprises a star-patterned socket, and wherein the second end of the shaft comprises a star-shaped plug such that the star-shaped plug of the second end of the shaft fits within the star-patterned socket of the first end of the double universal joint; and
- a jet turbine engine comprising the valve assembly of claim 1 within an air bleed line, wherein the valve assembly of claim 1 is configured to permit a flow of a bleed air into a turbine section of the jet turbine engine when the valve assembly is in the open position, and wherein the valve assembly of claim 1 is configured to block the flow of the bleed air into the turbine section when the valve assembly is in the closed position.

In another example, a manual positioning assembly for connection to a shaft of a valve and is configured to manually manipulate a disc of the valve between an open and a closed position. The manual valve positioning assembly includes a housing having a first end and a second end. The first end includes a flange configured for fastening the housing to the valve. The second end includes a conical feature. The manual positioning assembly also includes an alignment bushing within the second end of the housing and a double universal joint. The double universal joint includes a first end and a second end. The first end of the double universal joint is configured to be mechanically fastened to the shaft of the valve. The second end of the double universal joint is positioned within the alignment bushing and includes a socket that is configured to receive a tool that manually turns the double universal joint, the shaft, and the disc to position the disc in the open or the closed position.

The manual positioning assembly of the preceding paragraph can optionally include, additionally and/or alternatively, any one or more of the following features, configurations and/or additional components:

- wherein the housing comprises a bend between the first end and the second end of the housing such that the first end of the housing is concentrically aligned with the shaft of the valve and the second end of the housing is angularly misaligned from the first end of the housing and the shaft of the valve;
- wherein the conical feature of the second end of the housing tapers radially inward between the second end of the housing and the bend;
- wherein the double universal joint comprises: a center yoke comprising a first end and a second end; a first shaft extending from the first end of the double universal joint toward the center yoke and comprises a hinge that attaches to the first end of the center yoke; and a second shaft extending from the second end of the double universal joint toward the center yoke and comprises a hinge that attaches to the second end of the center yoke, wherein the center yoke translates a rotational torque applied to the first shaft to the second shaft;
- wherein the first end of the double universal joint is hollow, and wherein the shaft of the valve fits within the first end of the double universal joint;
- wherein the first end of the double universal joint and the shaft of the valve are mechanically coupled via an internal drive lug;
- wherein the socket of the second end of the double universal joint is a hex pattern;
- wherein the socket of the second end of the double universal joint is a square pattern; and
- a jet turbine engine comprising the manual positioning assembly of claim 12, wherein the manual positioning assembly of claim 12 is configured to manually manipulate the valve into the open position to provide a bleed air to start the jet turbine engine, and wherein the manual positioning assembly of claim 12 is configured to manually manipulate the valve into the closed position to stop the flow of the bleed air after the jet turbine engine is started.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. For example, valve 10 as discussed above with reference to FIGS. 1-4 is a butterfly valve within an engine bleed line of a jet turbine engine. In another non-limiting example, valve 10 can be any type of valve used to control flow within a tube. Therefore, it is intended that the invention not be limited to the embodiment(s) disclosed, but that the invention will include all embodiments falling within the scope of the appended claims.

The invention claimed is:

1. A valve assembly comprising:
    a cylindrical valve housing;
    a shaft extending through the cylindrical valve housing comprising a first end and a second end, wherein the first end is mechanically coupled to an actuation mechanism;
    a single disc attached to the shaft, wherein the shaft and the disc rotate within the cylindrical valve housing to position the disc in an open position or a closed position and wherein the single disc occludes the cylindrical valve housing in the closed position; and
    a manual positioning assembly attached to the cylindrical valve housing opposite of the actuation mechanism, wherein the manual positioning assembly comprises:
        a housing removably coupled to the cylindrical valve housing; and
        a double universal joint comprising a first end and a second end, wherein the first end of the double universal joint is mechanically coupled to the second end of the shaft, and wherein the second end of the double universal joint comprises a socket that is configured to receive a tool to manually turn the double universal joint, the shaft, and the disc to manually orient the disc in the open position or the closed position.

2. The valve assembly of claim 1, wherein the housing of the manual positioning assembly comprises a first end, a bend, and a second end, wherein the first end is mechanically fastened to the cylindrical valve housing, and wherein the bend is between the first end and the second end such that the first and second ends of the housing are angularly misaligned.

3. The valve assembly of claim 2, wherein the second end of the housing comprises a conical surface that tapers radially inward between the second end of the housing and the bend configured to direct a tool toward the socket of the second end of the double universal joint.

4. The valve assembly of claim 3, wherein the double universal joint comprises:
    a center yoke comprising a first end and a second end;
    a first shaft extending from the first end of the double universal joint toward the center yoke and comprises a hinge that attaches to the first end of the center yoke; and
    a second shaft extending from the second end of the double universal joint toward the center yoke and comprises a hinge that attaches to the second end of the center yoke, wherein the center yoke translates a torque applied to the second shaft to the first shaft.

5. The valve assembly of claim 4, wherein the manual positioning assembly further comprises a bushing contained within the second end of the housing, wherein the bushing surrounds the second end of the double universal joint.

6. The valve assembly of claim 5, wherein the bushing comprises an internal surface and a coating on the internal surface, wherein a surface energy of the coating is less than 36 dynes/cm.

7. The valve assembly of claim 6, wherein the first end of the double universal joint is concentrically aligned with the second end of the shaft.

8. The valve assembly of claim 7, wherein the first end of the double universal joint is hollowed out to receive the second end of the shaft.

9. The valve assembly of claim 8, wherein a pin extends through the first end of the double universal joint and the second end of the shaft.

10. The valve assembly of claim 9, wherein the first end of the double universal joint comprises a star-patterned socket, and wherein the second end of the shaft comprises a star-shaped plug such that the star-shaped plug of the second end of the shaft fits within the star-patterned socket of the first end of the double universal joint.

11. A jet turbine engine comprising the valve assembly of claim 1 within an air bleed line, wherein the valve assembly of claim 1 is configured to permit a flow of a bleed air into a turbine section of the jet turbine engine when the valve assembly is in the open position, and wherein the valve assembly of claim 1 is configured to block the flow of the bleed air into the turbine section when the valve assembly is in the closed position.

12. A manual positioning assembly for connection to a shaft of a valve configured to manually manipulate a single disc of the valve between an open and a closed position, wherein the manual valve positioning assembly comprises:
    a housing comprising a first end and a second end, wherein the first end comprises a flange configured for fastening the housing to the valve, and wherein the second end comprises a conical feature;
    an alignment bushing within the second end of the housing; and
    a double universal joint comprising a first end and a second end, wherein the first end of the double universal joint is configured to be mechanically fastened to the shaft of the valve, and wherein the second end is positioned within the alignment bushing and comprises a socket that is configured to receive a tool that manually turns the double universal joint, the shaft, and the single disc to position the single disc in the open or the closed position.

13. The manual positioning assembly of claim 12, wherein the housing comprises a bend between the first end and the second end of the housing such that the first end of the housing is concentrically aligned with the shaft of the valve and the second end of the housing is angularly misaligned from the first end of the housing and the shaft of the valve.

14. The manual positioning assembly of claim 13, wherein the conical feature of the second end of the housing tapers radially inward between the second end of the housing and the bend.

15. The manual positioning assembly of claim 14, wherein the double universal joint comprises:
    a center yoke comprising a first end and a second end;
    a first shaft extending from the first end of the double universal joint toward the center yoke and comprises a hinge that attaches to the first end of the center yoke; and
    a second shaft extending from the second end of the double universal joint toward the center yoke and comprises a hinge that attaches to the second end of the center yoke, wherein the center yoke translates a rotational torque applied to the first shaft to the second shaft.

16. The manual positioning assembly of claim 15, wherein the first end of the double universal joint is hollow, and wherein the shaft of the valve fits within the first end of the double universal joint.

17. The manual positioning assembly of claim 16, wherein the first end of the double universal joint and the shaft of the valve are mechanically coupled via an internal drive lug.

18. The manual positioning assembly of claim 12, wherein the socket of the second end of the double universal joint is a hex pattern.

19. The manual positioning assembly of claim 12, wherein the socket of the second end of the double universal joint is a square pattern.

20. A jet turbine engine comprising the manual positioning assembly of claim 12, wherein the manual positioning assembly of claim 12 is configured to manually manipulate the valve into the open position to provide a bleed air to start the jet turbine engine, and wherein the manual positioning assembly of claim 12 is configured to manually manipulate the valve into the closed position to stop the flow of the bleed air after the jet turbine engine is started.

* * * * *